G. H. BARNES.
ELECTRIC HEATER FOR STEERING WHEELS.
APPLICATION FILED MAR. 25, 1915.

1,168,146.

Patented Jan. 11, 1916.

WITNESSES:
Jno. Y. Phillips
H. E. Beck

INVENTOR
GEORGE H. BARNES,
BY Munn & Co.
ATTORNEYS

UNITED STATES PATENT OFFICE.

GEORGE HENRY BARNES, OF DUNHAM, QUEBEC, CANADA.

ELECTRIC HEATER FOR STEERING-WHEELS.

1,168,146.  Specification of Letters Patent.  Patented Jan. 11, 1916.

Application filed March 25, 1915. Serial No. 16,894.

*To all whom it may concern:*

Be it known that I, GEORGE HENRY BARNES, a subject of the King of England, and a resident of Dunham, in the county of Missisquoi and Province of Quebec, Dominion of Canada, have invented a certain new and useful Improvement in Electric Heaters for Steering-Wheels, of which the following is a specification.

My invention relates to improvements in electric heaters for steering wheels, and it consists in the combinations, constructions, and arrangements herein described and claimed.

An object of my invention is to provide a heating means which may be readily attached to the steering wheel of automobiles, motorboats, aeroplanes, and the like, without the necessity of dismantling the wheel in any way or of boring or otherwise mutilating it.

A further object of my invention is to provide a heating means for steering wheels in which the necessity of using brushes or movable contacts is avoided.

A further object of my invention is to provide a heating medium for steering wheels which also serves as an efficient gripping member for the wheel thus preventing the hands from slipping.

Other objects and advantages will appear in the following specification, and the novel features of the invention will be particularly pointed out in the appended claim.

My invention is illustrated in the accompanying drawings forming a part of this application, in which—

Figure 1:
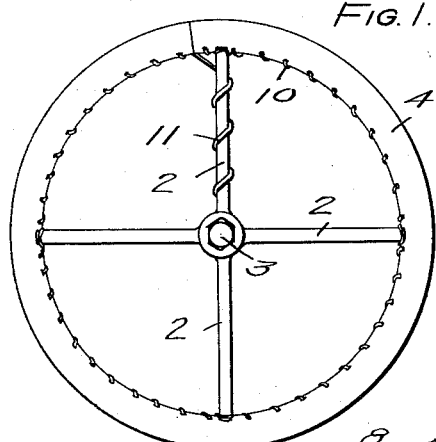
Figure 2:
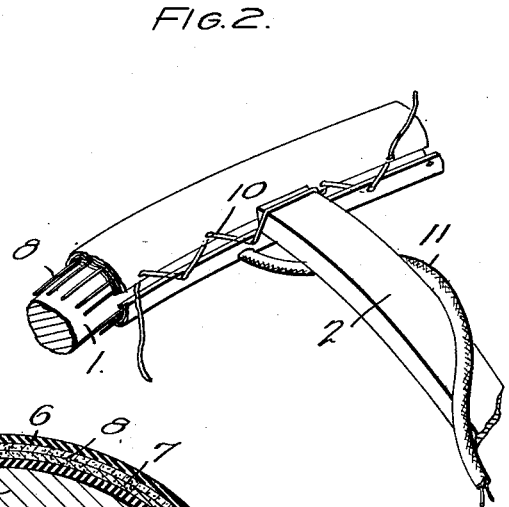
Figure 3:
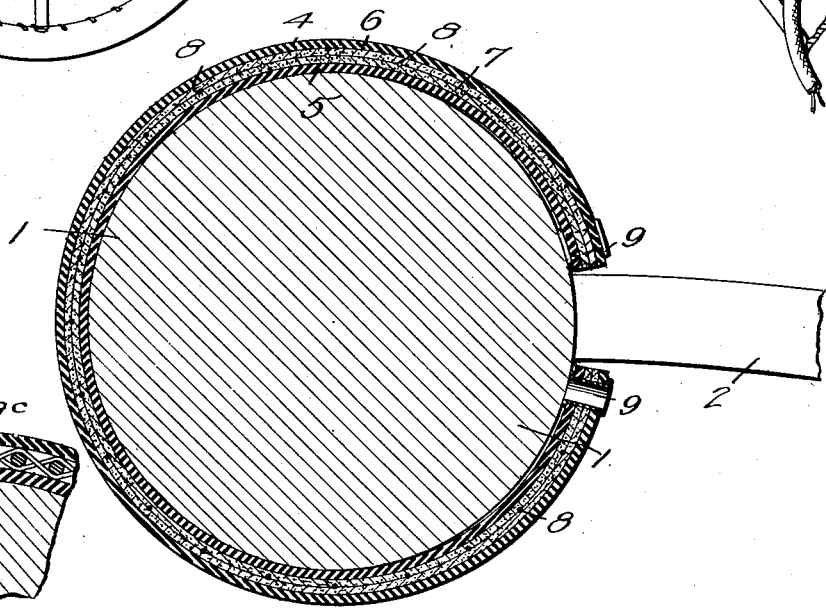
Figure 6:
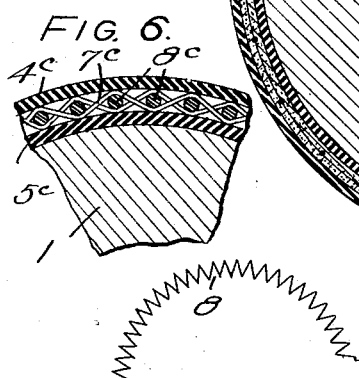
Figure 4:
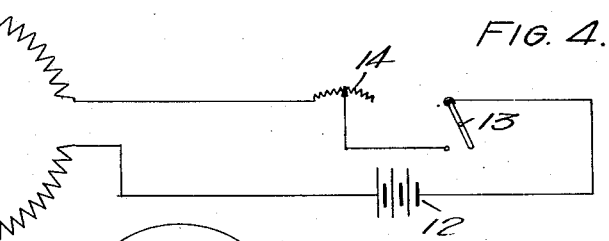
Figure 5:
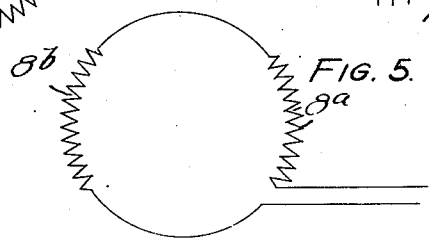

Figure 1 is a plan view of a wheel equipped with my heating device; Fig. 2 is a perspective view of a portion of the wheel showing the heating device applied thereto; Fig. 3 is an enlarged sectional view taken transversely of the rim and showing the heating device in section; Fig. 4 is a diagrammatic view of the circuit of the heating device; Fig. 5 is a diagrammatic view showing a modified form of the circuit; and Fig. 6 is a sectional view through the heating medium and a portion of the rim of a wheel, showing a modified form of the device.

In carrying out my invention, I make use of a steering wheel of the ordinary type consisting of the rim 1 which is carried by spokes 2 upon the steering post 3. Arranged to envelop the rim 1 is the heating member 4 which consists preferably of an outer covering of leather, rubber, textile fabric, or any flexible and suitable substance, while an inner lining 5 is provided and this lining may be of the same material as the outer covering 4 but should preferably be of some clinging material such as rubber or rubberized fabric. Next to the outer covering 4 is a layer 6 of some non-combustible material, such as asbestos fabric and a similar layer 7 is disposed next to the inner lining 5. Between the layers 6 and 7 are the resistance members 8. These may consist of German silver wire or substances having suitable resistance and heating qualities. As will be seen from Figs. 2 and 3 these wires are completely covered by the non-combustible layer. The heating member thus formed is made of sufficient size so that it may be wrapped around the rim and will substantially cover it. The layers are preferably held together at their edges by eyelets 9 which serve the double purpose of holding members and means for lacing the edges of the heating member together. To this end I use a suitable flexible strip or cord 10. The ends of the resistance element or heating element 8 are connected by means of the cable 11 with a battery 12, see Fig. 4. A switch 13 and a rheostat 14 are preferably disposed between the battery and the heating element 8.

From the foregoing description of the various parts of the device, the operation thereof may be readily understood.

The rim covering thus described may be laced in position by means of the flexible member 10 and the cable 11 may be attached to a storage battery or other suitable source of current. The covering for the rim makes a better grip for the steering wheel and at the same time it is heated when the switch 13 is closed. The rheostat is for the purpose of regulating the amount of heat.

Instead of distributing the heat entirely around the rim of the wheel, I may provide heating elements such as $8^a$ and $8^b$ at opposite sides of the wheel as shown in Fig. 5, these heating elements being preferably joined in series.

In Fig. 6 I have shown a modified form of the device, in which heating elements $8^c$ consist of wires woven directly into a layer of asbestos fabric $7^c$, an outer covering $4^c$ and an inner lining $5^c$ being provided for inclosing the heating member thus formed.

As stated before, one advantage of this device is that it may be readily attached to any existing type of steering wheel, without in any manner mutilating the same. It is simple in construction, can be readily applied and as readily removed. This device does not impair the usefulness of the wheel in any way, nor does it detract from the appearance of the wheel. The device does not necessitate the use of any special gloves or other hand covering, and does not necessitate a special form of construction in the steering wheel. It will be apparent, therefore, that the device has numerous advantages.

I claim:

An electric heating device for steering wheels comprising in combination, a flexible sheet having an outer layer, an inner layer, and a non-combustible layer disposed between the outer and the inner layer, an electrical resistance element inclosed in said non-combustible layer, the edges of the flexible sheet being brought adjacent to each other in the inner side of the rim, means for securing the adjacent edges together thereby holding the covering to the rim, said means comprising eyelets carried by the adjacent edges of the flexible sheet and a flexible cord adapted to pass through the eyelets for lacing the edges together.

GEORGE HENRY BARNES.

Witnesses:
G. E. BARNES,
E. E. R. LIGHTHAN.